(12) United States Patent
Hu et al.

(10) Patent No.: US 12,555,795 B2
(45) Date of Patent: Feb. 17, 2026

(54) NEGATIVE ELECTRODE PLATE, LITHIUM SECONDARY BATTERY, AND APPARATUS CONTAINING SUCH LITHIUM SECONDARY BATTERY

(71) Applicant: CONTEMPORARY AMPEREX TECHNOLOGY (HONG KONG) LIMITED, Hong Kong (CN)

(72) Inventors: Bobing Hu, Ningde (CN); Chengyong Liu, Ningde (CN); Yongsheng Guo, Ningde (CN); Meng Cheng, Ningde (CN); Jiawei Fu, Ningde (CN); Qian Li, Ningde (CN); Chengdu Liang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 462 days.

(21) Appl. No.: 17/582,401

(22) Filed: Jan. 24, 2022

(65) Prior Publication Data

US 2022/0200004 A1 Jun. 23, 2022

Related U.S. Application Data

(63) Continuation of application No. PCT/CN2020/110629, filed on Aug. 21, 2020.

(30) Foreign Application Priority Data

Aug. 28, 2019 (CN) .......................... 201910801685.2

(51) Int. Cl.
*H01M 4/134* (2010.01)
*H01M 4/62* (2006.01)
*H01M 10/0525* (2010.01)
*H01M 10/0562* (2010.01)
*H01M 4/02* (2006.01)

(52) U.S. Cl.
CPC ........... *H01M 4/625* (2013.01); *H01M 4/134* (2013.01); *H01M 10/0525* (2013.01);
(Continued)

(58) Field of Classification Search
CPC .. H01M 4/625; H01M 4/134; H01M 10/0525; H01M 10/0562; H01M 2004/021; H01M 2220/20; H01M 2300/0068
See application file for complete search history.

(56) References Cited

U.S. PATENT DOCUMENTS

2011/0212359 A1* 9/2011 Dai ....................... H01M 4/663
429/207
2014/0037924 A1* 2/2014 Furuta ................ H01M 50/198
428/328
(Continued)

FOREIGN PATENT DOCUMENTS

CN  107565137 A  1/2018
CN  108155387 A  6/2018
(Continued)

OTHER PUBLICATIONS

ISR for International Application PCT/CN2020/110629 mailed Nov. 26, 2020.
(Continued)

*Primary Examiner* — Osei K Amponsah
(74) *Attorney, Agent, or Firm* — Ladas & Parry LLP

(57) ABSTRACT

This application provides a lithium secondary battery and a negative electrode plate for the lithium secondary battery. The negative electrode plate includes a negative electrode current collector and a negative electrode active material layer disposed on at least one surface of the negative electrode current collector, where a surface of the negative electrode active material layer closer to the current collector is provided with an elastic coating. And the elastic coating
(Continued)

includes an elastic polymer and a conductive agent. At a pressure of 1 MPa to 20 MPa, the elastic coating has a compression deformation of 20% to 80% and an elastic modulus of 1 MPa to 800 MPa. And optionally, at the pressure of 1 MPa to 20 MPa, the elastic coating has a compression deformation of 30% to 60% and an elastic modulus of 5 MPa to 100 MPa.

11 Claims, 3 Drawing Sheets

(52) U.S. Cl.
CPC .. *H01M 10/0562* (2013.01); *H01M 2004/021* (2013.01); *H01M 2220/20* (2013.01); *H01M 2300/0068* (2013.01)

(56) References Cited

U.S. PATENT DOCUMENTS

| | | | |
|---|---|---|---|
| 2017/0301920 A1 | 10/2017 | Liu et al. | |
| 2018/0151884 A1* | 5/2018 | Yushin | H01M 4/134 |

FOREIGN PATENT DOCUMENTS

| | | |
|---|---|---|
| CN | 108346523 A | 7/2018 |
| CN | 109755464 A | 5/2019 |
| CN | 109755465 A | 5/2019 |
| CN | 109755467 A | 5/2019 |
| CN | 109817987 A | 5/2019 |
| CN | 111199833 A | 5/2020 |
| CN | 111200131 A | 5/2020 |
| KR | 20180065167 A | 6/2018 |

OTHER PUBLICATIONS

Written Opinion for International Application PCT/CN2020/110629 mailed Nov. 26, 2020.
OA1 of CN corresponding to counterpart application 201910801685.2 mailed Jul. 29, 2021.
OA2 of CN corresponding to counterpart application 201910801685.2 mailed Sep. 2, 2021.

* cited by examiner

NEGATIVE ELECTRODE PLATE, LITHIUM SECONDARY BATTERY, AND APPARATUS CONTAINING SUCH LITHIUM SECONDARY BATTERY

CROSS-REFERENCE TO RELATED APPLICATIONS

This application is a continuation of International Patent Application No. PCT/CN2020/110629 filed on Aug. 21, 2020, which claims priority to Chinese Patent Application No. 201910801685.2 filed on Aug. 28, 2019. The aforementioned patent applications are incorporated herein by reference in their entirety.

TECHNICAL FIELD

This application relates to the field of batteries, and more specifically, to a negative electrode plate, a lithium secondary battery, and an apparatus containing such lithium secondary battery.

BACKGROUND

Because liquid electrolytes currently used in commercial lithium-ion batteries are prone to leak and burn, existing electric vehicles and energy storage products are often at risk of safety hazards. Especially, with the explosive growth of the new energy industry in recent years, battery fires and explosions are occasionally reported. Therefore, consumers have an increasingly urgent demand for battery safety. In consideration that the inherent characteristics of the liquid electrolyte are difficult to change, solid electrolytes and corresponding solid-state batteries have become an ultimate solution commonly acknowledged in the industry to resolve the safety problem of lithium batteries.

However, solid-state batteries are typically challenged by the easy growth of dendrites at a negative electrode of metallic lithium. In addition, the negative electrode of metallic lithium is prone to swell with the deposition of lithium ions. As a result, the solid electrolyte suffers plastic deformation under pressure, and will not recover its original shape after the pressure disappears. In this case, pores appear on an interface between the metallic lithium and the electrolyte, causing a contact failure. Such interface failure not only causes battery polarization to increase and cycling to decrease, but also further worsens uneven deposition of metallic lithium in subsequent charging, causing the battery to be easily short-circuited during cycling. Therefore, a full solid-state lithium secondary battery is extremely prone to short-circuit failures in continuous charge and discharge cycles.

SUMMARY

In view of the problems in Background, this application is intended to provide a negative electrode plate containing an elastic coating and a lithium secondary battery containing such negative electrode plate. This application can improve stability of an interface between an electrode and a solid electrolyte, reducing interface contact failures caused by deposition and dissolution of metallic lithium during battery charging and discharging, and can also relieve an internal expansion stress of the solid-state battery during charging and discharging, thereby avoiding battery short circuit.

To achieve the foregoing objectives, according to a first aspect of this application, this application provides a negative electrode plate for a lithium secondary battery, including a current collector and a negative electrode active material layer disposed on at least one surface of the current collector, where an elastic coating is provided on a surface of the negative electrode active material layer closer to the current collector, and the elastic coating includes an elastic polymer and a conductive agent; at a pressure of 1 MPa to 20 MPa, the elastic coating has a compression deformation of 20% to 80% and an elastic modulus of 1 MPa to 800 MPa; and optionally, at the pressure of 1 MPa to 20 MPa, the elastic coating has a compression deformation of 30% to 60% and an elastic modulus of 5 MPa to 100 MPa.

According to a second aspect of this application, this application provides a lithium secondary battery, where the lithium secondary battery includes a solid electrolyte, the solid electrolyte is selected from a sulfide solid electrolyte and/or a polymer solid electrolyte, and the lithium secondary battery includes the negative electrode plate according to the first aspect of this application.

This application further provides an apparatus containing the foregoing lithium secondary battery.

Compared with the prior art, this application has at least the following beneficial effects: In the negative electrode plate containing the elastic coating provided in this application, the elastic polymer included in the coating helps reduce the elastic modulus and the internal stress, while the conductive agent helps improve conductivity of the coating to reduce transference resistance of the electrons. The elastic coating can effectively alleviate a volume change generated during charging and discharging processes of a lithium secondary battery, reduce an internal stress caused by volume expansion of the negative electrode during the charging process, to inhibit a short circuit, and reduce interface contact failures caused by volume shrinkage of the negative electrode during the discharging process. The apparatus in this application includes the lithium secondary battery provided in this application, and therefore provides at least the same advantages as the lithium secondary battery.

DESCRIPTION OF EMBODIMENTS

Figure 1:
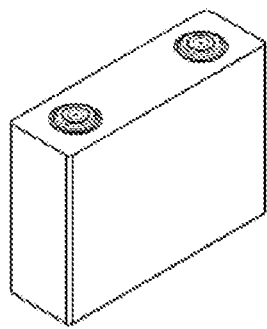
FIG. 1 is a schematic diagram of an embodiment of a lithium secondary battery.

To describe in detail the technical content, structural features, and intended objectives and effects of the technical solutions, the following provides detailed descriptions with reference to specific embodiments.

Firstly, a negative electrode plate for a lithium secondary battery according to the first aspect of this application includes a current collector and a negative electrode active material layer disposed on at least one surface of the current collector, a surface of the negative electrode active material layer closer to the current collector is provided with an elastic coating, and the elastic coating includes an elastic polymer and a conductive agent; at a pressure of 1 MPa to 20 MPa, the elastic coating has a compression deformation of 20% to 80% and an elastic modulus of 1 MPa to 800 MPa; and optionally, at the pressure of 1 MPa to 20 MPa, the elastic coating has a compression deformation of 30% to 60% and an elastic modulus of 5 MPa to 100 MPa.

The elastic coating can effectively alleviate a volume change generated during charging and discharging processes of a lithium secondary battery, reduce an internal stress caused by volume expansion of the negative electrode during the charging process, to inhibit a short circuit, and reduce interface contact failures caused by volume shrinkage of the negative electrode during the discharging process. When the battery is discharged, dissolution of metallic lithium at the negative electrode causes the volume to shrink, the coating resumes its shape, and the internal stress is released, thereby helping reduce the interface failures caused by the volume shrinkage of the negative electrode. When the battery is charged, deposition of metallic lithium on the negative electrode side causes volume expansion of the negative electrode, thereby generating an internal expansion stress F. Because the elastic modulus E of a composite coating on the negative electrode side is less than that of metallic lithium, the coating is compressed and deformed:

$$F = E\frac{\Delta L}{L}$$

where L is an initial thickness of the coating, ΔL is a compressed thickness of the coating, and a compressed thickness of the coating is determined by a thickness of deposited lithium.

The compression deformation and elastic modulus of the elastic coating have great impact on performance of the battery. The compression deformation of the elastic coating during cycling is closely related to both the thickness and elastic modulus. Excessively large deformation is not conducive to deformation recovery and performance stability of the elastic coating. Excessively small deformation indicates that the elastic coating is excessively hard (excessively great elastic modulus) or thick, neither of which is conducive to performance optimization of the battery.

A ratio of the amount of elastic polymer to the amount of conductive agent in the elastic coating has great impact on the performance of the battery. A larger amount of elastic polymer contained in the coating is conducive to reduction of the elastic modulus and internal stress, and a larger amount of conductive agent is conducive to improvement of conductivity of the coating, to reduce migration resistance of electrons. Therefore, the amounts of the elastic polymer and conductive agent need to be adjusted based on an actual situation. When the amount of elastic polymer contained in the composite layer is excessively high and the amount of the conductive agent is excessively small, because electrons are difficult to migrate, the overall impedance is increased, and capacity and efficiency of the battery are reduced. When the amount of elastic polymer contained in the composite layer is excessively small and the amount of conductive agent is excessively large, a buffering effect of the elastic coating is inadequate and cycling improvement is insignificant.

Therefore, adjusting a ratio of the amount of elastic polymer to the amount of conductive agent in the elastic coating has great impact on the performance of the battery. When mass of the elastic polymer is 30% to 90% of total mass of the coating layer, and mass of the conductive agent is 10% to 70% of the total mass of the coating layer, the elastic coating has a function of buffering, which can effectively reduce deformation of the negative electrode, to reduce a risk of short circuit of the battery. In addition, overall resistance change of the battery is relatively small, the capacity and efficiency decrease of the battery are also relatively small, and the battery performance is improved.

Optionally, the mass of the elastic polymer is 50% to 80% of the total mass of the coating, and the mass of the conductive agent is 20% to 50% of the total mass of the coating. The buffering by the elastic coating can effectively reduce the deformation of the negative electrode, further reducing the risk of the short circuit of the battery and improving the overall performance of the battery.

The thickness of the elastic coating has some influences on the performance of the battery. The excessively thick elastic coating causes the battery impedance to increase and performance to reduce. When the elastic coating is excessively thin, despite the relatively small impact on a cycling function of the battery, a volume change requirement of the buffer layer cannot be satisfied, and problems such as poor uniformity and reduced adhesion to the negative electrode plate are likely to occur.

Optionally, a thickness of the elastic coating is 1 μm to 100 μm, and further optionally, 5 μm to 20 μm.

A surface coarseness of the elastic coating has some impact on the performance of the battery. An excessively high coarseness of the elastic coating deteriorates the interface contact between the electrode plate and the elastic coating, and the overall impedance of the battery increases significantly and the cycling performance is difficult to improve; while an excessively small coarseness of the elastic coating is not conducive to improvement of the adhesion to the electrode plate.

Optionally, a surface coarseness of the elastic coating is 0.2 μm to 20 μm, and further optionally, 0.5 μm to 2 μm.

Further, preferably, a value of the thickness T (μm) of the elastic coating, the surface coarseness $Ra_1$ (μm) of the current collector, and the surface coarseness $Ra_2$ (μm) and the elastic modulus E (mPa) of the elastic coating satisfy the following equation:

$$2.50 \leq E \cdot Ra_1 \cdot Ra_2 / [T(Ra_1 + Ra_2)] \leq 2.60$$

herein, T denotes the thickness of the elastic coating; $Ra_1$ denotes the surface coarseness of the current collector; $Ra_2$ denotes the surface coarseness of the elastic coating; and E denotes the elastic modulus.

The type of the elastic polymer in the elastic coating affects the elastic modulus and the compression deformation of the elastic coating, further affecting electrochemical performance of the battery. When the elastic modulus is excessively low, strength of an elastic buffer layer is relatively low and the compression deformation is excessively large, which is not conducive to the deformation recovery and the performance stability of the elastic coating. When the elastic modulus is excessively high, the compression deformation is relatively small, indicating that the elastic coating is too hard to achieve an effective buffering effect, which is not conducive to the performance improvement of the battery.

Optionally, the elastic polymer includes one or more of polyethylene, polyethylene oxide, polyvinyl chloride, polyvinylidene fluoride, polypropylene, polystyrene butadiene, or polyisobutylene.

A type of the conductive carbon in the elastic coating mainly affects electronic conductivity of the elastic coating and a charge transfer process at an interface between the elastic coating and a current collector, thereby further affecting the electrochemical performance of the battery. Therefore, conductive carbon with a sheet structure or a spherical structure is prone to agglomerate in the elastic coating, which is not conducive to uniform dispersion. Therefore, the overall polarization resistance of the battery is significantly increased, which causes capacity and efficiency to decrease. A composite of conductive carbon with a fibrous structure and conductive carbon with a spherical structure helps form a continuous internal conductive path, to improve an electron transference process inside and on the interface, thereby improving the overall performance of the battery. Therefore, preferably, the conductive agent includes both the conductive carbon with a fiber structure and the conductive carbon with a spherical structure.

Optionally, the conductive agent includes conductive carbon with a fibrous structure and conductive carbon with a spherical structure, the conductive carbon with a fibrous structure includes one or more of carbon nanotube (CNT), carbon fiber (VGCF), or Ketjen black, the conductive carbon with a spherical structure includes one or more of conductive carbon black (SP), conductive graphite, or acetylene black, and preferably, the conductive carbon with a fibrous structure is carbon nanotube CNT and the conductive carbon with a spherical structure is conductive carbon black SP. Optionally, a mass ratio of the conductive carbon with a fiber structure to the conductive carbon with a spherical structure is 1:5 to 5:1, preferably 1:2 to 2:1, and more preferably 1:1.

A surface coarseness of the current collector has some impact on the performance of the battery. The surface coarseness of the current collector affects the surface coarseness of the elastic coating. When the surface coarseness of the current collector (copper foil) is excessively large, the coarseness of the elastic coating significantly increases, and as a result, the interface contact between the electrode plate and the elastic coating deteriorates, the overall impedance of the battery increases significantly, and the cycling performance is difficult to improve. When the surface coarseness of the current collector (copper foil) is excessively small, the coarseness of the elastic coating is excessively small, which is not conducive to improvement of the adhesion to the electrode plate.

Optionally, a surface coarseness of the current collector is 0.05 μm to 5 μm, and further optionally, 0.1 μm to 1 μm.

The negative electrode current collector may be various materials suitable to be used as a negative electrode current collector of an electrochemical energy storage apparatus in the art. For example, the negative electrode current collector may include but is not limited to a metal foil, or more specifically, may include but is not limited to a copper foil.

A carbon material, metallic lithium, silicon, tin, LTO, or the like capable of intercalating or deintercalating lithium ions can be typically used as the negative electrode active material. In particular, the negative electrode active material layer includes metallic lithium and/or a lithium alloy.

The negative electrode plate includes the negative electrode current collector, the elastic coating, and the negative electrode active material layer in sequence.

In addition, a lithium secondary battery according to a second aspect of this application is described. The lithium secondary battery includes a solid electrolyte, the solid electrolyte includes a sulfide solid electrolyte and/or a polymer solid electrolyte, and the lithium secondary battery includes the negative electrode plate according to the first aspect of this application.

Further, the lithium secondary battery includes a positive electrode, the positive electrode includes a positive electrode active material, and the positive electrode active material is an NCM ternary material, that is, a ternary material of lithium nickel cobalt manganate.

In the lithium secondary battery in this application, specific types and composition of the positive electrode plate are not specifically limited, and may be selected based on an actual need.

In the lithium secondary battery in this application, the solid electrolyte is selected from a sulfide solid electrolyte and/or a polymer solid electrolyte. Optionally, the sulfide electrolyte is selected from one or more of $Li_3PS_4$, $Li_6PS_5Cl$, $Li_{10}GeP_2S_{12}$, or $Li_7P_3S_{11}$.

This application has no particular limitation on a shape of the lithium secondary battery, and the lithium secondary battery may have a square or any other shape. FIG. 1 shows a lithium secondary battery 5 with a square structure used as an example.

In some embodiments, the lithium secondary battery may include an outer package for packaging the positive electrode plate, the negative electrode plate, and an electrolyte.

In some embodiments, the outer package of the lithium secondary battery may be a soft package, for example, a soft bag. A material of the soft package may be plastic, for example, may include one or more of polypropylene PP, polybutylene terephthalate PBT, polybutylene succinate PBS, or the like. Alternatively, the outer package of the lithium secondary battery may be a hard shell, such as a hard plastic shell, an aluminum shell, a steel shell, or the like.

In some embodiments, lithium secondary batteries may be assembled into a battery module, and the battery module may include a plurality of secondary batteries. A specific number may be adjusted based on application and capacity of the battery module.

Figure 2:
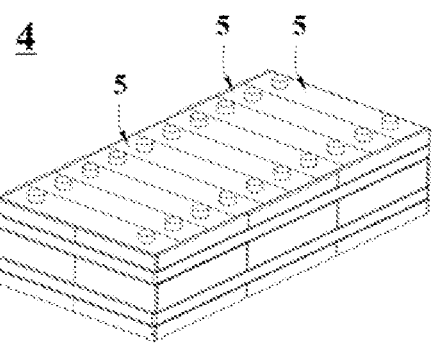
FIG. 2 is a schematic diagram of an embodiment of a battery module.

FIG. 2 shows a battery module 4 used as an example. Referring to FIG. 2, in the battery module 4, a plurality of lithium secondary batteries 5 may be sequentially arranged along a length direction of the battery module 4. Certainly, the lithium secondary batteries 5 may be arranged in any other manner. Further, the plurality of lithium secondary batteries 5 may be fixed by using fasteners.

Optionally, the battery module 4 may further include a housing with accommodating space, and the plurality of lithium secondary batteries 5 are accommodated in the accommodating space.

In some embodiments, the foregoing battery modules may be further assembled into a battery pack, and a number of battery modules included in the battery pack may be adjusted based on application and capacity of the battery pack.

Figure 3:
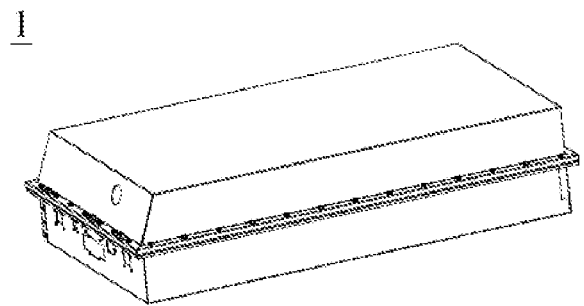
FIG. 3 is a schematic diagram of an embodiment of a battery pack.
Figure 4:
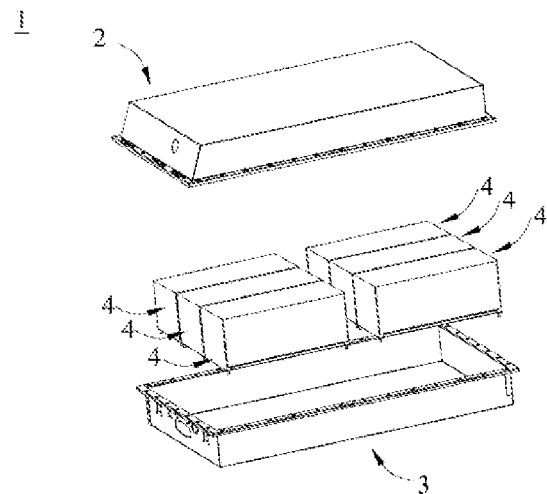
FIG. 4 is an exploded view of FIG. 3.

FIG. 3 and FIG. 4 show a battery pack 1 used as an example. Referring to FIG. 3 and FIG. 4, the battery pack 1 may include a battery box and a plurality of battery modules 4 disposed in the battery box. The battery box includes an upper box body 2 and a lower box body 3. The upper box body 2 can cover the lower box body 3 to form enclosed space for accommodating the battery modules 4. The plurality of battery modules 4 may be arranged in the battery box in any manner.

Apparatus

A third aspect of this application provides an apparatus, where the apparatus includes the lithium secondary battery according to the second aspect of this application. The lithium secondary battery may be used as a power source for the apparatus, or an energy storage unit of the apparatus. The apparatus may be, but is not limited to, a mobile device (for example, a mobile phone or a laptop), an electric vehicle (for example, a pure electric vehicle, a hybrid electric vehicle, a plug-in hybrid electric vehicle, an electric bicycle, an electric scooter, an electric golf vehicle, or an electric truck), an electric train, a ship, a satellite, an energy storage system, or the like.

A lithium secondary battery, a battery module, or a battery pack may be selected for the apparatus according to requirements for using the apparatus.

Figure 5:
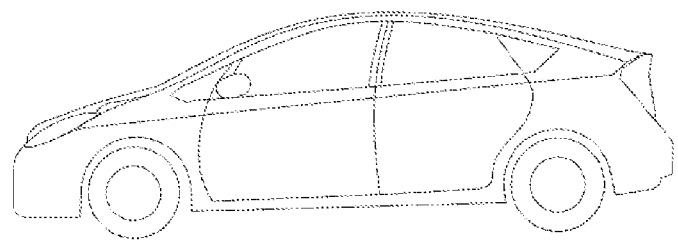
FIG. 5 is a schematic diagram of an embodiment of an apparatus using a lithium secondary battery as a power source.

FIG. 5 shows an apparatus used as an example. The apparatus is a pure electric vehicle, a hybrid electric vehicle, a plug-in hybrid electric vehicle, or the like. To meet a requirement of the apparatus for high power and high energy density of a battery, a battery pack or a battery module may be used.

In another example, the apparatus may be a mobile phone, a tablet computer, a laptop, or the like. The apparatus is usually required to be light and thin, and a secondary battery may be used as a power source.

To describe in detail the technical content, structural features, and intended objectives and effects of the technical solutions, the following provides detailed descriptions with reference to specific embodiments. It should be understood that these embodiments are merely intended to illustrate this application but not to limit the scope of this application.

Batteries in the examples are all prepared in the following method:

(1) Preparation of a negative electrode plate:

An elastic polymer and a conductive agent were mixed well according to types and a mass ratio in Table 1, and after thorough stirring, an elastic slurry was obtained; and firstly, the elastic slurry was applied on Cu foil and dried, to obtain a current collector coated with an elastic polymer coating, then lithium metal foil was combined on the surface of the elastic coating through a roll-in process, and the lithium metal was punched into a disk with a diameter of 14 mm, to obtain a lithium metal negative electrode plate containing the elastic coating.

(2) Preparation of a positive electrode plate:

A positive electrode active material $LiNi_{1/3}Co_{1/3}Mn_{1/3}O_2$, an electrolyte material $Li_3PS_4$, a conductive agent of Super-P, and a binder styrene-butadiene rubber were mixed at a mass ratio of 70:24:3:3, and a solvent of toluene was added, and stirred under an action of a vacuum mixer until a system was uniform, to obtain a positive electrode slurry; and the positive electrode slurry was uniformly applied on two surfaces of aluminum foil as the positive electrode current collector, dried at room temperature, and transferred to an oven for continuous drying, and then cold pressing and slitting were performed to obtain the positive electrode plate.

(3) Preparation of a solid electrolyte plate

An electrolyte material $Li_3PS_4$ and a binder of styrene-butadiene rubber were mixed at a mass ratio of 97:3, and a solvent of toluene was added, and stirred under an action of a vacuum mixer until a system was uniform, to obtain an electrolyte slurry; and the electrolyte slurry was uniformly applied on a surface of a glass pane, dried at room temperature, and transferred to an oven for continuous drying, and then cold pressing and slitting were performed to obtain the electrolyte plate.

(4) The foregoing positive electrode plate, the solid electrolyte plate, and the negative electrode plate were sequentially laminated, and at 300 MPa, pressure was increased to prepare a solid lithium secondary battery.

A comparative example is about a battery without an elastic coating. (No step of applying the elastic slurry was performed.)

A parameter and a performance test method of the lithium secondary battery are described below:

(1) Thickness test: Thicknesses of a current collector and a current collector-elastic coating were separately measured by using a micrometer. A difference between the two thicknesses was a thickness of the elastic coating.

(2) Compression deformation test: The negative electrode plate was pressed in a circular sleeve mold, a pressure range was 1 MPa to 20 MPa, a thickness change value of a composite layer before and after the pressure was measured, and a ratio of the change value to the initial thickness was compression deformation.

(3) Elastic modulus test: The negative electrode plate was pressed in a circular sleeve mold to test the compression deformation within the pressure range of 1 MPa to 20 MPa, no less than five points were selected form the pressure and compression deformation data to perform plotting and linear fitting, and a slope obtained through fitting was the elastic modulus.

(4) Surface coarseness test: The copper foil or the negative electrode plate was put under a high-precision optical microscope for observation. In 3D imaging mode, surface height distribution information of the copper foil or the negative electrode plate within a specified range could be obtained. The surface coarseness could be obtained by calculating a maximum surface height difference of the copper foil or the negative electrode plate in different zones.

(5) Cycling performance test:

At 25° C., the solid-state lithium secondary battery was charged to a voltage of 4.2 V at a constant current of 0.1 C, then charged to a current of 0.05 C at a constant voltage of 4.2 V, and then discharged at a constant current of 0.1 C until a final voltage was 2.8 V; and discharge capacity of the initial cycle was recorded. Then a charging and discharging cycle was performed based on the foregoing operations. When 80% of the initial capacity was reached after cycling, charging and discharging stopped. In this case, a number of cycles was the high-temperature cycling life.

(6) Electrochemical impedance test: A solid-state lithium secondary battery was prepared, the electrochemical impedance test was conducted by using a Chenhua electrochemical workstation, a frequency range was 0.01 Hz to 1 MHz, and a perturbation signal was 5 mV.

(7) Gram capacity test: A solid-state lithium secondary battery was prepared, the gram capacity test was conducted by using a LAND battery tester, the charging/discharging rate was 0.1 C, and the charging/discharging cut-off voltage was 2.8 V to 4.2 V.

(8) Coulomb efficiency test: Coulomb efficiency test was conducted by using a LAND battery tester, the charging/discharging rate was 0.1 C, and the charging/discharging cut-off voltage was 2.8 V to 4.2 V.

Related parameters of lithium secondary batteries provided in Examples 1 to 24 and the comparative example are shown in Table 1.

TABLE 1

Related parameters of lithium secondary batteries

| | Type of elastic polymer | Percent of elastic polymer (%) | Type of conductive agent | Percent of conductive agent (%) | Thickness of elastic coating (μm) | Compression deformation (%) | Elastic modulus (MPa) | Surface coarseness (μm) | Coarseness of copper foil (μm) |
|---|---|---|---|---|---|---|---|---|---|
| Example 1 | Polyethylene oxide | 30 | CNT | 70 | 10 | 25 | 110 | 1 | 0.5 |
| Example 2 | Polyethylene oxide | 50 | CNT | 50 | 10 | 38 | 68 | 1 | 0.5 |
| Example 3 | Polyethylene oxide | 60 | CNT | 40 | 10 | 45 | 40 | 1 | 0.5 |
| Example 4 | Polyethylene oxide | 80 | CNT | 20 | 10 | 58 | 15 | 1 | 0.5 |
| Example 5 | Polyethylene oxide | 90 | CNT | 10 | 10 | 72 | 6 | 1 | 0.5 |
| Example 6 | Polyethylene oxide | 60 | CNT | 40 | 1 | 88 | 40 | 1 | 0.5 |
| Example 7 | Polyethylene oxide | 60 | CNT | 40 | 5 | 60 | 40 | 1 | 0.5 |
| Example 8 | Polyethylene oxide | 60 | CNT | 40 | 20 | 30 | 40 | 1 | 0.5 |
| Example 9 | Polyethylene oxide | 60 | CNT | 40 | 100 | 12 | 40 | 1 | 0.5 |
| Example 10 | Polyethylene oxide | 60 | CNT | 40 | 10 | 45 | 40 | 0.2 | 0.5 |
| Example 11 | Polyethylene oxide | 60 | CNT | 40 | 10 | 45 | 40 | 0.5 | 0.5 |
| Example 12 | Polyethylene oxide | 60 | CNT | 40 | 10 | 45 | 40 | 2 | 0.5 |
| Example 13 | Polyethylene oxide | 60 | CNT | 40 | 10 | 45 | 40 | 20 | 0.5 |
| Example 14 | Polyethylene oxide | 60 | CNT | 40 | 10 | 45 | 40 | 2 | 0.05 |
| Example 15 | Polyethylene oxide | 60 | CNT | 40 | 10 | 45 | 40 | 2 | 0.1 |
| Example 16 | Polyethylene oxide | 60 | CNT | 40 | 10 | 45 | 40 | 2 | 1 |
| Example 17 | Polyethylene oxide | 60 | CNT | 40 | 10 | 45 | 40 | 2 | 5 |
| Example 18 | Polyvinylidene fluoride | 60 | CNT | 40 | 10 | 32 | 95 | 2 | 1 |
| Example 19 | Styrene-butadiene rubber | 60 | CNT | 40 | 10 | 75 | 8 | 2 | 1 |
| Example 20 | Polyethylene | 60 | CNT | 40 | 10 | 12 | 780 | 2 | 1 |
| Example 21 | Polyethylene oxide | 60 | Conductive graphite | 40 | 10 | 44 | 42 | 2 | 1 |
| Example 22 | Polyethylene oxide | 60 | SP | 40 | 10 | 45 | 42 | 2 | 1 |
| Example 23 | Polyethylene oxide | 60 | Mixing CNT and SP in 1:1 | 40 | 10 | 46 | 38 | 2 | 1 |
| Example 24 | Polyethylene oxide | 60 | Mixing CNT and acetylene black in 1:1 | 40 | 10 | 47 | 37 | 2 | 1 |
| Comparative example | / | / | / | / | / | / | / | / | / |

Performance test results of lithium secondary batteries provided in Examples 1 to 24 and the comparative example are shown in Table 2.

TABLE 2

Performance test results of lithium secondary batteries

| | Number of cycles | Impedance (Ω) | Gram capacity (mAh/g) | Coulomb efficiency (%) |
|---|---|---|---|---|
| Example 1 | 15 | 35 | 138 | 98 |
| Example 2 | 28 | 39 | 135 | 98 |
| Example 3 | 32 | 42 | 133 | 97 |
| Example 4 | 30 | 48 | 134 | 95 |
| Example 5 | 22 | 61 | 122 | 90 |
| Example 6 | 12 | 30 | 141 | 99 |
| Example 7 | 21 | 33 | 139 | 98 |
| Example 8 | 29 | 53 | 130 | 97 |
| Example 9 | 22 | 95 | 104 | 72 |
| Example 10 | 24 | 48 | 134 | 98 |
| Example 11 | 27 | 42 | 134 | 98 |
| Example 12 | 31 | 44 | 135 | 99 |
| Example 13 | 16 | 81 | 115 | 82 |
| Example 14 | 26 | 44 | 130 | 97 |
| Example 15 | 28 | 40 | 136 | 99 |
| Example 16 | 33 | 41 | 134 | 98 |

TABLE 2-continued

Performance test results of lithium secondary batteries

|  | Number of cycles | Impedance (Ω) | Gram capacity (mAh/g) | Coulomb efficiency (%) |
| --- | --- | --- | --- | --- |
| Example 17 | 19 | 67 | 125 | 88 |
| Example 18 | 27 | 43 | 131 | 96 |
| Example 19 | 21 | 46 | 128 | 94 |
| Example 20 | 18 | 51 | 127 | 94 |
| Example 21 | 28 | 48 | 126 | 93 |
| Example 22 | 29 | 50 | 124 | 92 |
| Example 23 | 34 | 38 | 140 | 99 |
| Example 24 | 30 | 42 | 137 | 98 |
| Comparative example | 9 | 30 | 141 | 99 |

It could be seen from Table 1 and Table 2 that the number of cycles and impedance in the examples with the elastic coating added were improved compared with those in the comparative example. This indicated that the elastic coating of the negative electrode could effectively reduce a risk of a short circuit of a solid-state battery, maintain stability of an electrode interface, reduce deposition and dissolution of metallic lithium during charging and discharging of the battery, and alleviate the expansion stress inside the solid-state battery during charging and discharging, thereby avoiding short circuit of the battery. At a pressure of 1 MPa to 20 MPa, the elastic coating had a compression deformation of 20% to 80% and an elastic modulus of 1 MPa to 800 MPa; and optionally, at the pressure of 1 MPa to 20 MPa, the elastic coating had a compression deformation of 30% to 60% and an elastic modulus of 5 MPa to 100 MPa.

Further, it could be seen from Examples 1 to 5 that the amounts of the elastic polymer and conductive agent contained in the elastic coating affected the impedance of the battery, and also affected the compression deformation and the elastic modulus of the elastic coating, thereby further affecting the electrochemical performance of the battery.

When the amount of elastic polymer in the elastic coating was excessively large and the amount of conductive agent was excessively small, because electrons were difficult to migrate, overall impedance was increased, and the number of cycles, the capacity, and the efficiency of the battery were reduced. On the contrary, when the amount of elastic polymer in the elastic coating was excessively small and the amount of conductive agent was excessively large, the compression deformation of the elastic coating was excessively low, the elastic modulus was excessively high, and as a result, the buffering effect of the elastic coating was inadequate, and the number of cycles was not increased significantly. Therefore, a mass percentage of the elastic polymer was 30% to 90%, and preferably 50% to 80%; and a mass percentage of the conductive agent was 10% to 70%, and preferably, 20% to 50%.

Further, it could be seen from Example 3 and Examples 6 to 9 that the thickness of the elastic coating affected the impedance of the battery and the electrochemical performance of the battery. If the elastic coating was excessively thick, the battery impedance was increased and the number of cycles, the capacity, and the efficiency were reduced. If the elastic coating was excessively thin, the volume change requirement of the buffer layer could not be satisfied, problems such as poor uniformity and reduced adhesion to the negative electrode plate were likely to occur, and the number of cycles was reduced. Therefore, the thickness of the elastic coating was 1 μm to 100 μm, and preferably, 5 μm to 20 μm.

Further, it could be seen from Example 3 and Examples 10 to 13 that, the surface coarseness of the elastic coating affected the impedance and the electrochemical performance of the battery. An excessively great surface coarseness of the elastic coating caused deterioration of the interface contact between the negative electrode plate and the elastic coating, and the overall impedance of the battery was increased significantly, and the cycling performance was difficult to improve; while an excessively small coarseness of the elastic coating was not conducive to improvement of the adhesion to the electrode plate, and a process was more difficult. Therefore, the surface coarseness of the elastic coating was 0.2 μm to 20 μm, and preferably, 0.5 μm to 2 μm.

Further, it could be seen from Example 12 and Examples 14 to 17 that the surface coarseness of the current collector (copper foil) affected bonding between the elastic coating and the current collector, thereby affecting the electrochemical characteristic of the battery. When the surface coarseness of the copper foil was excessively large, interface contact between the elastic coating and the copper foil was not even, which was not conducive to the transference of interfacial charge, the battery impedance was increased, and the capacity was reduced. When the surface coarseness of the copper foil was excessively small, it is not conducive to improvement of the adhesion to the elastic coating, and the preparation process was difficult. Therefore, the surface coarseness of the copper foil was 0.05 μm to 5 μm, and preferably, 0.1 μm to 1 μm.

Further, it could be seen from Example 16 and Examples 18 to 20 that the type of the elastic polymer in the elastic coating affected the elastic modulus and the compression deformation of the elastic coating, thereby affecting electrochemical performance of the battery. When the elastic modulus was excessively low, strength of an elastic buffer layer was relatively low and the compression deformation was excessively large, which was not conducive to the deformation recovery and the performance stability of the elastic coating. When the elastic modulus was excessively high, the compression deformation was relatively small, indicating that the elastic coating was too hard to achieve an effective buffering effect, which was not conducive to the performance improvement of the battery. At a pressure of 1 MPa to 20 MPa, the elastic coating had a compression deformation of 20% to 80% and an elastic modulus of 1 MPa to 800 MPa; and optionally, at the pressure of 1 MPa to 20 MPa, the elastic coating had a compression deformation of 30% to 60% and an elastic modulus of 5 MPa to 100 MPa.

Further, it could be seen from Example 16 and Examples 21 to 24 that the type of the conductive carbon in the elastic coating mainly affected electronic conductivity of the elastic coating and a charge transfer process at an interface between the elastic coating and a current collector, thereby further affecting the electrochemical performance of the battery. Therefore, conductive carbon with a sheet structure or a spherical structure was prone to agglomerate in the elastic coating, which was not conducive to uniform dispersion. Therefore, the overall polarization resistance of the battery was significantly increased, which caused the capacity and efficiency to decrease. A composite of conductive carbon with a fibrous structure and conductive carbon with a spherical structure helped form a continuous internal conductive path, to improve an electron transference process inside and on the interface, thereby improving the overall performance of the battery. Therefore, preferably, the conductive agent included the conductive carbon with a fiber structure and the conductive carbon with a spherical structure, and further optionally, carbon nanotube CNT and conductive carbon black SP.

Further, it could be seen from Table 1 and Table 2 that in Example 23, the value of the thickness T (μm) of the elastic coating, the surface coarseness $Ra_1$ (μm) of the current collector, and the surface coarseness Rae (μm) of the elastic coating and the elastic modulus E (Mpa) calculated using the following equation was 2.533. In this case, the test results of the lithium secondary battery (especially the number of cycles and coulomb efficiency) were excellent.

$$E \cdot Ra_1 \cdot Ra_2/[T(Ra_1+Ra_2)]=2.533$$

The various parameters of Example 23 satisfied the foregoing equation, and the number of cycles of the provided lithium secondary battery reached 34 and the coulomb efficiency reached 98%.

According to the disclosure of this specification, a person skilled in the art of this application may further make appropriate changes or modifications to the foregoing implementations. Therefore, this application is not limited to the foregoing disclosed and described specific implementations, and some changes or modifications made to this application shall also fall within the protection scope claimed in this application.

What is claimed is:

1. A negative electrode plate for a lithium secondary battery, comprising:
   a negative electrode current collector;
   an elastic coating disposed on at least one surface of the negative electrode current collector; and
   a negative electrode active material layer disposed on the elastic coating, wherein,
   the elastic coating comprises an elastic polymer and a conductive agent;
   the conductive agent is a uniform mixture of conductive carbon with a fibrous structure and conductive carbon with a spherical structure, the conductive carbon with a fibrous structure is carbon nanotube, and a mass ratio of the conductive carbon with a fibrous structure to the conductive carbon with a spherical structure is 1:1;
   at a pressure of 1 MPa to 20 MPa, the elastic coating has a compression deformation of 30% to 60% and an elastic modulus of 5 MPa to 100 MPa;
   a mass of the elastic polymer is 50% to 80% of a total mass of the elastic coating, and a mass of the conductive agent is 20% to 50% of the total mass of the elastic coating; and
   the elastic polymer comprises one or more of polyethylene, polyethylene oxide, polyvinylidene fluoride, or polystyrene butadiene.

2. The negative electrode plate according to claim 1, wherein a surface coarseness of the elastic coating is 0.2 μm to 20 μm.

3. The negative electrode plate according to claim 2, wherein a thickness of the elastic coating is 1 μm to 100 μm.

4. The negative electrode plate according to claim 1, wherein
   the conductive carbon with a spherical structure comprises one or more of conductive carbon black, conductive graphite, or acetylene black.

5. The negative electrode plate according to claim 1, wherein a surface coarseness of the current collector is 0.05 μm to 5 μm.

6. The negative electrode plate according to claim 1, wherein values of a thickness T of the elastic coating (in μm), a surface coarseness $Ra_1$ of the current collector (in μm), a surface coarseness $Ra_2$ of the elastic coating (in μm), and an elastic modulus E of the elastic coating (in mPa) satisfy the following equation:

$$2.50 \leq E \cdot Ra_1 \cdot Ra_2/[T(Ra_1+Ra_2)] \leq 2.60.$$

7. The negative electrode plate according to claim 1, wherein the negative electrode active material layer comprises metallic lithium and/or a lithium alloy.

8. A lithium secondary battery, comprising:
   a solid electrolyte; and
   the negative electrode plate according to claim 1;
   wherein the solid electrolyte is a sulfide solid electrolyte and/or a polymer solid electrolyte.

9. The lithium secondary battery according to claim 8, wherein the lithium secondary battery further comprises a positive electrode, the positive electrode comprises a positive electrode active material, and the positive electrode active material is an NCM ternary material.

10. The lithium secondary battery according to claim 8, wherein the sulfide solid electrolyte is selected from one or more of $Li_3PS_4$, $Li_6PS_5Cl$, $Li_{10}GeP_2S_{12}$, or $Li_7P_3S_{11}$.

11. An apparatus, comprising the lithium secondary battery according to claim 8.

* * * * *